T. B. Thorpe,
Pocket Knife,

No. 46,832.      Patented Mar. 14, 1865.

Witnesses:
M. W. Livingston
C. L. Toptiff

Inventor:
T. B. Thorpe

UNITED STATES PATENT OFFICE.

T. B. THORPE, OF NEW YORK, N. Y.

COMBINED KNIFE AND FORK.

Specification forming part of Letters Patent No. 46,832, dated March 14, 1865.

*To all whom it may concern:*

Be it known that I, T. B. THORPE, of the city, county, and State of New York, have invented a new and Improved Combination of a Pocket Knife and Fork; and I do hereby declare that the following is a full, clear, and exact description thereof, which will enable others skilled in the art to make and use the same, reference being had to the accompanying drawings, forming part of this specification, in which—

Figures 1, 2:
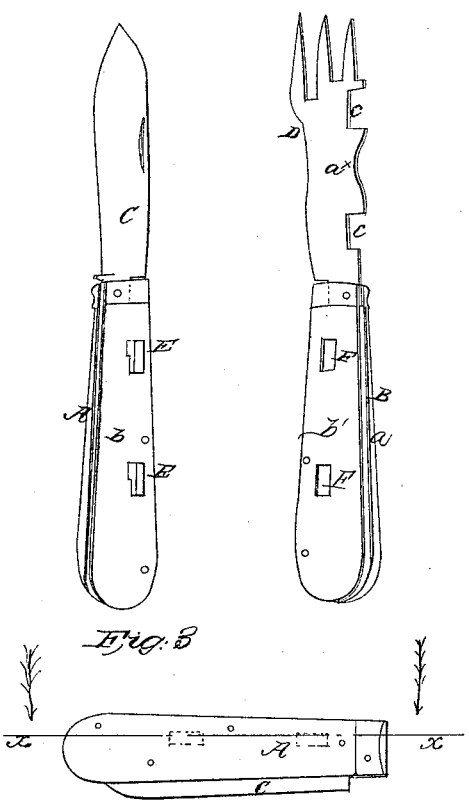
Figure 3:
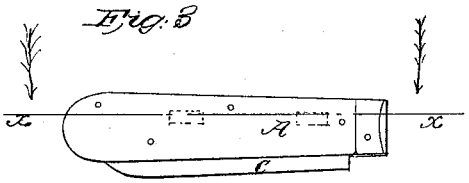
Figure 4:
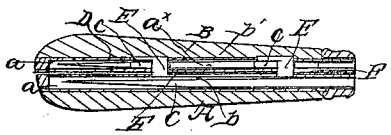

Figure 1 is a detached side view of the knife portion of my invention in an open state; Fig. 2, a detached side view of the fork portion of the same in an open state; Fig. 3, a side view of the two parts combined and in a closed state; Fig. 4, a longitudinal section of Fig. 3, taken in the line $x\ x$.

Similar letters of reference indicate like parts.

This invention consists in combining a knife and fork with a handle in such a manner that the knife and the fork, when not required for use, may be folded or closed within the handle, kept firmly in contact, and carried in the pocket with the same convenience as an ordinary pocket-knife, and when not required for use the knife and fork portions rendered capable of being readily detached, so that they may be used in the same way as if they were made separately and had no connection with each other.

The object of the invention is to obtain a combination of a pocket knife and fork which will admit of the two parts being readily connected together and secured firmly in a connected state, and at the same time admit of being readily disconnected when required.

The handle of the device is composed of two similar parts, A B, each of which is provided with a spring, $a$, at its back and rear part, like the spring of an ordinary pocket-knife blade, and the two parts of the handle are shaped like the handle of a pocket-knife, and may be constructed in the same manner, with the exception of the inner sides, $b\ b'$, which have not the ordinary external covering. The part A has a knife-blade, C, fitted in it in the same way as an ordinary pocket-knife blade is fitted in its handle, while the part B has a fork, D, fitted in it in the same manner. (See Figs. 1 and 2.) The inner side $b$ of the knife portion A of the handle has two hook projections, E E, attached to it. These projections are in line with each other, as shown clearly in Fig. 1. In the inner side $b'$ of the portion B of the handle there are made two slots, F F, of sufficient capacity to receive the hook projections E E, the slots F and hook projections E having such a relative position with each other that when the two parts A B of the handle are adjusted together they will coincide in position and resemble an ordinary handle which has all its parts permanently connected together. (See Fig. 4.) The two parts A B are connected together in consequence of the projections E catching over the edges of the slots F, the parts A B, either or both, being moved longitudinally after the projections are fitted in the slots in order to effect this result. The fork D has two notches, $c\ c$, made in the edge of its plate $a^x$, which edge fits within the part B when the fork is closed, and these notches are made of such capacity and have such a position in the edge of the fork-plate $a^x$ as to receive the portions of the hook projections E E which extend through the plate $b'$ of the part B when the two parts A B are adjusted together. The function of these notches $c\ c$ is an important one, for they prevent, when the two parts A B of the handle are adjusted together and the fork is closed, the hook projections E moving casually so as to release the parts A B, for it will be understood in order to disconnect said parts the hook projections must be free from the edges of the slots F. This will be fully understood by referring to Fig. 4, in which the two parts A B are shown connected together, with the knife and fork closed. The notches $c$ of the fork plate $a$, it will be seen by referring to this figure, prevent the hook projections from moving in line with the slots F, and in order to detach A B the fork must be opened wholly or partially.

Thus it will be seen that by a very simple arrangement I obtain a pocket knife and fork the two parts of which may be readily adjusted together and firmly secured in contact, and also readily separated and disconnected.

I do not claim, broadly, a pocket knife and fork composed of two parts so arranged as to be capable of being adjusted together and separated or disconnected; but

I claim as new and desire to secure by Letters Patent—

A combined pocket knife and fork provided with separate parts or handles A B having respectively hook projections E and slots F at their inner sides, in combination with notches $c$ in the fork-plate $a^x$, so arranged when the fork is closed as to fit over or receive the hook projections E and prevent the casual detachment of the parts, substantially as described.

T. B. THORPE.

Witnesses:
M. M. LIVINGSTON,
C. L. TOPLIFF.